(12) United States Patent
Kanbayashi et al.

(10) Patent No.: US 6,468,643 B1
(45) Date of Patent: Oct. 22, 2002

(54) LAMINATED PRODUCT

(75) Inventors: Takashi Kanbayashi, Aichi-ken; Takashi Iiyama, Chiba-ken; Hiroyuki Katayama; Tamio Kawasumi, both of Kanagawa-ken, all of (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/424,057

(22) PCT Filed: Apr. 14, 1999

(86) PCT No.: PCT/JP99/01981

§ 371 (c)(1),
(2), (4) Date: Nov. 18, 1999

(87) PCT Pub. No.: WO00/61362

PCT Pub. Date: Oct. 19, 2000

(51) Int. Cl.[7] .............................................. B32B 27/32
(52) U.S. Cl. ................. 428/293.7; 428/297.4; 428/297.7; 428/298.1; 428/220; 428/423.1; 52/385; 349/73
(58) Field of Search .......................... 428/293.7, 297.4, 428/297.7, 298.1, 220, 423.1; 52/385; 349/73

(56) References Cited

FOREIGN PATENT DOCUMENTS

JP   09300521   * 11/1997

* cited by examiner

*Primary Examiner*—Rich Weisberger
(74) *Attorney, Agent, or Firm*—Burns, Doane, Swecker, & Mathis, L.L.P.

(57) ABSTRACT

The invention provides a laminated product of urethane-based resin. That is, the invention arranges a continuous reinforcing fiber to one direction, impregnates the arranged fiber with thermoplastic resin to form a prepreg sheet having 50% in volume ratio of the fiber, laminates two or more resulting prepreg sheets so as to intersect fiber directions at right angles or further laminate of the prepreg sheet to form a fiber-reinforced resin layer, laminates a urethane-based resin layer on the resulting fiber-reinforced resin layer, and thus provides a urethane-based resin laminated product having excellent dimensional stability and application ability.

13 Claims, 2 Drawing Sheets

LAMINATED PRODUCT

TECHNICAL FIELD

The present invention relates to a laminated tile or laminated sheet which is obtained by using urethane-based resin, has excellent dimensional stability and application ability in site, and can be suitably used for indoor and outdoor flooring, wall covering and road paving.

BACKGROUND ART

Floor covering materials generally include wood-based, stone-based, fiber-based, resin-based and rubber-based materials and are selectively used depending upon property, function and use. Particularly, polyvinyl chloride resin is a representative resin-based flooring material, is inexpensive and has excellent ability in processing and design application. Thus, the resin becomes widespread use for residence flooring in the form of a cushion tile or design tile. The resin is also used for flooring of shops, public services and other broad range of uses. However, polyvinyl chloride resin contains a large amount of plasticizer when used for flooring, and thus, after application, leads to problems on inferior dimensional stability with time. That is, shrinkage due to decrease in plasticizer generates a gap in a corner portion or joint area. As an essential problem, polyvinyl chloride resin has a large linear expansion coefficient as compared with wood-based, stone-based and metal-based materials, and thus leads to large dimensional change under environment of great temperature variation. For example, when a polyvinyl chloride tile is directly heated, the tile greatly swells on account of a large coefficient of linear thermal expansion and causes knockout of the joint area or peeling of the tile. On the other hand, remarkably low temperature leads to tile shrinkage and develops a gap at the joint area. These problems are not limited to polyvinyl chloride resin. Any resin has the same essential problem to some extent.

Further, conventional tiles of polyvinyl chloride resin are mostly prepared by extrusion or rolling continuously in one axis. As a result, difference in dimensional change between the longitudinal and transverse directions due to the difference in density or residual stress is observed in a finished product. Consequently, in the step of applying tiles to the substrate, caution must be taken to the application direction so as to eliminate local deviation of dimensional change in the longitudinal and transverse directions. That is, extremely complicated laying operation is required.

On the other hand, urethane-based resin is excellent in impact resistance, abrasion resistance, thermal resistance, chemical resistance and waterproof property as compared with polyvinyl chloride resin, and is used for veranda, corridor, floor and roof of factories and public services and other objects where durability and waterproof property are required in particular. Thus, urethane-based resin has good result as a high functional flooring material. In the case of urethane-based resin, general application method to flooring is to coat or spray urethane raw materials on the substrate in the application site. These methods do not form joint area and thus can sufficiently exhibit essential waterproof property of urethane-based resin. Further, urethane raw materials before curing are liquid having relatively low viscosity, excellent in self-leveling property, and advantageous in increasing flatness after application even in the presence of surface irregularity of the substrate. However, the process for curing urethane raw materials in the application site requires a long coating time and prolonged curing period. And the spray coating method requires large sized equipment and considerable working space. Further, generation of urethane mist during course of spraying provides problems on workability. Prohibition of putting an article on the whole application area during curing is also a factor for the extending application period. When the substrate is smooth and inclined, it becomes difficult to coat with a constant thickness on the overall surface of application.

On the other hand, particularly quick curing type urethane are accompanied by considerable exothermic heat in the application period. Thus, after curing, volume shrinkage due to curing of urethane raw materials overlaps volume shrinkage accompanied by temperature reduction, and increases the possibility of warpage and peeling when adhesion to the substrate is weak. Even though adhesion of the substrate is sufficient and no peeling is observed in the application period, peeling force acts latently and thus peeling becomes possible, when markedly great external force is applied or when adhesive force is decreased after a long passage of time. Consequently, in a view point including the curing period, the operation of coating and curing urethane raw materials on the substrate in the application site remains strongly uncertain feeling for future dimensional stability and peeling. Further, cured urethane-based resin has also poor dimensional stability like polyvinyl chloride resin for large temperature variation, and thus generation of gap or knockout in a joint area is anticipated when used for a tile material. Though urethane-based resin can be greatly expected as a high-functional flooring material, improvement in dimensional stability and application ability has become a great problem to be solved.

Firstly, a process for improving application ability of urethane-based resin has been proposed in Japanese Laid-Open Patent HEI 9-131834. According to the process, urethane-based resin is cured before application and not during application. The resulting prefabricated tile-like material is put on a portion or the whole area of the substrate to be applied. The process can reduce the time for application. However, dimensional stability of the tile itself has not been improved because the tile is a laminated product consisting of urethane-based resin and uncured butyl rubber. On the other hand, a structure of inorganic long fiber reinforced waterproof layer using urethane-based resin as a waterproof layer has been disclosed in Japanese Laid-Open Patent HEI 9-300521. However, conventional process is used and urethane materials are coated in the application site. Thus, the application time cannot be reduced as mentioned above. Further, presence of the inorganic long fiber reinforced layer can supposedly maintain dimensional stability as overall laminated product. However, in view of including the cure time, volume shrinkage takes place as a result of curing of urethane raw materials as mentioned above, shrinking force generates in the urethane layer, and damage of warpage and peeling develops latently.

Therefore, the object of the invention is to overcome the above problems and to provide an urethane-based resin laminated product having excellent dimensional stability and application ability.

DISCLOSURE OF THE INVENTION

As a result of an intensive investigation on urethane-based resin materials having excellent dimensional stability and application ability in view of the above subject, the present inventors have found that a laminated product having excellent dimensional stability and application ability in site can be obtained by laminating urethane-based resin on a fiber-reinforced resin. Thus, the present invention has been completed.

That is, the aspect of the invention relates to the following (1)~(11).

(1) A laminated product characterized by laminating a urethane-based resin layer on a fiber-reinforced resin layer, consisting of two or more layers, and having a linear expansion coefficient of $2.0 \times 10^{-5}/°$ C. or less and thermal dimensional change of 0.1% or less in the dimensional stability for the two fiber directions, wherein the fiber-reinforced resin layer is obtained by laminating two or more prepreg sheets so as to intersect fiber directions at right angles or obtained by further laminating a non-woven fabric on one or both surface of the resulting laminated prepreg, and said prepreg sheet has a thickness of 50 to 1,000 $\mu$m and is obtained by arranging a continuous reinforcing fiber in one direction and impregnating the arranged fiber with thermoplastic resin so as to make a volume ratio of said reinforcing fiber 40 to 80%.

(2) The laminated product according to (1), wherein the laminated product has a thickness of 1 to 5 mm.

(3) The laminated product according to (1), wherein, in the fiber-reinforced resin layer, two or more prepreg sheets are laminated so as to intersect fiber directions at right angles and successively electrical discharge treatment is applied on one or both surface of the resulting laminate so as to obtain a surface tension of 40 to 60 dyne/cm.

(4) The laminated product according to (1), wherein the urethane-based resin layer has a thickness of 0.3 to 3.0 mm.

(5) The laminated product according to (1), wherein the reinforcing fiber used in the fiber-reinforced resin layer is glass fiber and the thermoplastic resin is polypropylene.

(6) The laminated product according to (1), wherein a pressure sensitive adhesive layer is further laminated on the surface of fiber-reinforced resin layer opposite the surface of laminating the urethane-based resin layer.

(7) The laminated product according to (1), wherein the same or different species of resin layer is further laminated on the surface of fiber-reinforced resin layer opposite the surface of laminating the urethane-based resin layer.

(8) The laminated product according to (7), wherein a pressure-sensitive adhesive layer is further laminated on the surface of the same or different species of resin layer.

(9) The laminated product according to (7), wherein a non-woven fabric is further laminated on the surface of the same or different species of resin layer.

(10) The laminated product according to anyone of (1) to (9), wherein the laminated product is a sheet having a width of 50 to 2,000 mm.

(11) The laminated product according to anyone of (1) to (9), wherein the laminated product is a tile having a side length of 50 to 2,000 mm.

(12) An application process of a laminated product according to (10) or (11), wherein application of two or more laminated products to a substrate is characterized by forcing to set clearance in a joint area and filling the clearance with a sealing agent as joint treatment.

(13) A flooring material consisting of the laminated product according to anyone of (1) to (9).

DESCRIPTION OF REFERENCE NUMBERS

Figure 1:
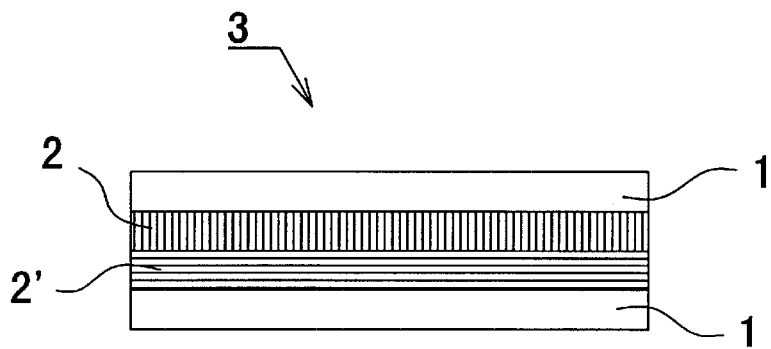
FIG. 1 is a sectional view of a fiber-reinforced PP sheet used for the laminated product of the invention in the case of laminating a non-woven fabric on both surfaces.

1. Polyester non-woven fabric
2. Prepreg sheet
2'. Prepreg sheet (Direction of reinforcing fiber is perpendicular to the direction of reinforcing fiber in 2.)
3. Fiber-reinforced resin
4. Urethane-based resin
5. Modified asphalt
6. Elastomeric ethylene/butene copolymer
7. Polyester non-woven fabric

BEST MODE FOR CARRYING OUT THE INVENTION

Reinforcing fibers which can be used for the prepreg sheet in the invention include, glass fiber, carbon fiber, boron fiber, ceramic fiber and other high-strength fibers. No particular restriction is imposed upon these fibers. However, the reinforcing fibers must have a linear expansion coefficient of $2.0 \times 10^{-5}/°$ C. or less as shown in the invention. In these fibers, glass fiber is preferably used in view of dimensional stability, productivity and cost of the laminated product in the invention. No particular limitation is put upon the species of glass fiber. Glass fibers which can be used are prepared from E-glass, C-glass, A-glass and other various species of glasses which has conventionally be used for glass fibers. A glass fiber having a diameter of 5 to 36 $\mu$m is preferably used in view of strength and production efficiency of the prepreg sheet.

Representative thermoplastic resins which can be used for the prepreg sheet in the invention include, for example, polypropylene (hereinafter referred to as PP), polyethylene, polystyrene, polyvinyl chloride and other general purpose thermoplastic resins, polyester, polyamide, polyvinyl alcohol and polycarbonate. In these resins, PP is preferably used in view of processing ability and cost.

No particular restriction is imposed upon the species of PP. PP which can be selected includes homopolymer, block copolymer, random copolymer, and composite obtained by addition of auxiliary materials such as elastomer and filler. Marketed products can be used and those having a melt flow index of 10 to 400 g/10 min. at 230° C. are preferably used in view of production efficiency of prepreg sheet.

The thermoplastic resin used for the prepreg sheet in the invention can be preferably incorporated, when needed, with an antioxidant, weathering stabilizer, antistatic agent, releasing agent and other stabilizers, and modifiers for enhancing adhesive strength between reinforcing fiber and thermoplastic resin. Various stabilizers have already been added to marketed, thermoplastic resin pellets. However, an antioxidant, for example, can be added in order to improve thermal stability of the thermoplastic resin. As a specific procedure, the stabilizer to be increased is previously kneaded into the thermoplastic resin to form pellets having a high concentration of the stabilizer. The resulting pellets are added to the preparation step of prepreg sheet so as to obtain desired concentration of the stabilizer. Alternatively, the stabilizer is directly added to the melt-kneading step of the thermoplastic resin for the preparation of prepreg sheet.

A preferred preparation process of prepreg sheet of the invention has been disclosed, for example, in Japanese Patent HEI 4-42168. In the process, monofilaments of the reinforcing fiber are treated with a coupling agent such as γ-methacryloxy-propyltrimethoxysilane, and several hundreds to several thousands of the monofilaments are collected to form a yarn. The resulting yarn is paralleled under uniform tension, brought into contact with molten thermoplastic resin and wiped with hot rolls to impregnate thermoplastic resin at a constant velocity. Thus, a prepreg sheet of the invention has thickness of 50 to 1,000 μm, preferably 100 to 500 μm. Prepreg sheet having a thickness less than 50 μm or more than 1,000 μm is unfavorable because preparation of prepreg sheet is difficult as a result of technical problems.

When two prepreg sheets of the invention are laminated so as to intersect fiber direction at right angles, difference in shrinkage develops between a fiber direction and perpendicular direction thereof and accompanies warpage to some extent in the laminated prepreg sheet. The warping tendency remains after lamination of the urethane-based resin layer depending upon adhesion conditions. However, in the laminated product of the invention, warpage is scarcely observed and provides no influence at all on the dimensional stability. Quite no problem develops when adhered to the substrate by way of adhesive agent or pressure-sensitive adhesive. As a preferred method for avoiding the above warping tendency, for example, two sheets obtained by laminating two prepreg sheets so as to intersect fiber directions at right angles are further laminated by adhering two surfaces having the same fiber direction to each other to form a laminated sheet consisting of four prepreg sheets. As another example of the preferred method, three prepreg sheets are laminated so as to intersect fiber direction at right angles. Preferred lamination method of prepreg sheets is press molding at melt temperature of the thermoplastic resin or adhesion by inserting into pressure rollers which are heated to temperature for melting the thermoplastic resin.

The fiber-reinforced resin layer in the invention is preferred to have sufficient adhesive strength with a urethane-based resin. The term sufficient adhesive strength means to have a ply separation strength of more than 5 N/cm in accordance with JIS A-1454. PP or polyethylene, which exhibits poor adhesion to the urethane-based resin layer, has a ply separation strength of 5 N/cm or less. When using these thermoplastic resins, it is preferred to previously modify the surface of fiber-reinforced resin layer in order to increase adhesion strength with a urethane-based resin layer. Surface modification can be carried out, for example, by fabricating to make the surface of fiber-reinforced resin layer irregular, by laminating the fiber-reinforced resin layer with another material having an irregular surface or high adhesive strength with urethane-based resin, by applying primer to the surface of a fiber-reinforced resin layer, and by applying discharge treatment to the surface of a fiber-reinforced resin layer.

A particularly preferred embodiment in the above surface modification methods is a method for laminating two or more prepreg sheets so as to intersect fiber direction at right angles and further laminating a non-woven fabric on one or both surfaces of the resulting laminated material. Non-woven fabrics have an irregular surface, many fiber ends knock out from the surface, an infinite number of gaps further exist on the surface, and thus increase in physical adhesive strength can be expected. No particular restriction is imposed upon the non-woven fabric for use. Exemplary materials of the non-woven fabric include polyester, polyamide and PP. Polyester is preferably used in particular. Lamination of a non-woven fabric on a prepreg sheet can be carried out by the same procedures as laminating the above prepreg sheets each other. The amount of a lamination is preferably 5 to 100 g/m² in the case of a polyester non-woven fabric. The above method for laminating a non-woven fabric can also be favorably utilized for the embodiment of forming a three layer structure by laminating the same or different species of resin layer, because the adhesive strength between a fiber-reinforced resin layer and the same or different species of resin layer can be enhanced.

On the other hand, another embodiment particularly preferred in the above surface modification methods is to laminate two or more prepreg sheets so as to intersect fiber directions at right angles and further to carry out discharge treatment on one or both surfaces of the resulting laminate product so as to obtain surface tension of 40 to 60 dyne/cm. The term discharge treatment is referred to as carry out corona discharge, arc discharge or glow discharge on the surface of a fiber-reinforced resin layer and increasing surface tension by oxidizing the surface. The discharge treatment can realize good adhesion between a fiber-reinforced resin layer and an urethane-based resin layer. Adhesive strength greater than the case of inclusion of the above non-woven fabric can be obtained depending upon the discharge treatment conditions. When the surface tension is lower than 40 dyne/cm, the treatment condition is unfavorable because sufficient adhesive strength cannot be obtained. When the surface tension exceeds 60 dyne/cm, the treatment condition is also unfavorable because severe deterioration generates on the surface of the fiber-reinforced resin layer or blocking and other problems are observed. The above method of carrying out discharge treatment can also be favorably utilized for the embodiment of forming a three layer structure by laminating the same or different species of resin layer, because the adhesive strength between the fiber-reinforced resin layer and the same or different species of resin layer can be enhanced.

The urethane-based resin which can be used for the invention includes, for example, a high polymer obtained by reacting tolylene diisocyanate, diphenylmethane diisocyanate and other isocyanate compounds with propylene glycol, polyethylene glycol and other polyols. The high polymer is a reaction curing type which cures from liquid raw materials to a solid by crosslinking reaction. Known curing agents such as 3,3'-dichloro-4,4'-diaminodiphenylmethane can be used. Known catalysts can also be used in order to control curing velocity. In view of property and applicability of the laminated tile of the invention, preferred materials of cured urethane-based resin are highly elastic and have, as stiffness, a bending modulus of 300 MPa or less, more preferably 200 MPa or less. When the stiffness of the urethane-based resin exceeds 300 MPa, a preferred application method is to physically expand urethane-based resin by addition of an expanding agent or spraying to obtain a slightly expanded material having 1.5 to 3.0 times in expansion magnification in order to decrease apparent stiffness. In such case, shrinkage accompanied by curing of the urethane-based resin layer can also be inhibited by expansion to some tent.

On the other hand, as another embodiment of urethane-based resin used in the invention, thermoplastic polyurethane obtained by reacting the above diisocyanate compound with diol into a straight chain configuration can also be preferably used.

The urethane-based resin used for the invention can be incorporated, when needed, with an weathering stabilizer and other various species of stabilizers, antistatic agent and other various additives, pigment for coloring and its dispersant, and filler.

In the same or different species of urethane-based resin layer of the invention, the same species of resin means identical urethane-based resin and can be a urethane-based resin having quite the same composition or different composition for the urethane-based resin layer. On the other hand, the different species of resin mean resins other than urethane-based resin, are not restricted in particular, and include general purpose resins such as PP, polyethylene and polyvinyl chloride, and various elastomers. Similarly to the above urethane-based resin, the same or different species of resin can also be incorporated with an weathering stabilizer and other various species of stabilizers, antistatic agent and other various additives, pigment for coloring and its dispersant, and filler.

As to the method for laminating a reaction-curing type urethane-based resin layer on the fiber-reinforced resin layer in the invention, the raw materials are premixed into two components, that is, a main component and curing agent. The two components are then mixed and applied or sprayed with simultaneous mixing to the surface of the fiber-reinforced resin layer.

A preferred embodiment for applying urethane raw materials is to place a fiber-reinforced resin layer on a plane which is horizontally adjusted in advance and has a frame and to apply urethane raw materials to the surface of the layer. The method can form a urethane-based resin layer having a uniform thickness. When spraying, the fiber-reinforced resin layer is horizontally arranged and a mixture of urethane raw materials is preferably sprayed on the fiber-reinforced resin layer. Further, a unit layer of urethane-based resin is prepared in advance and successively can be laminated on the fiber-reinforced resin layer. In one case, an adhesive is required for lamination. On the other hand, various kinds of adhesion method can be used for laminating thermoplastic polyurethane. A press machine is used for a batch process. Compression molding can be carried out at a melting temperature of thermoplastic polyurethane. However, when the thermoplastic polyurethane sheet is superimposed on the fiber-reinforced resin layer and inserted into the press machine, compression pressure, temperature and time must be controlled so as to maintain thickness of thermoplastic polyurethane before compression molding as much as possible.

Another preferred embodiment by using compression molding is to preheat the fiber-reinforced resin layer alone at temperature higher than the melting temperature of thermoplastic polyurethane, superimpose thermoplastic polyurethane on the preheated fiber-reinforced resin layer, and carry out compression molding at room temperature. As another embodiment of the batch method, urethane-based resin is adhered without fusion by using an adhesive agent. As a still another embodiment of the batch method, insert molding can be preferably carried out. A fiber-reinforced resin is inserted into a mold for forming a tile, and successively thermoplastic polyurethane is injection molded to obtain a laminated product. On the other hand, in the continuous method, extrusion lamination can be preferably carried out by using an extruder. Molten thermoplastic polyurethane is delivered through a T-die and laminated on a fiber-reinforced resin layer to obtain a laminated product of the invention.

A process for laminating the same or different species of resin layer on a fiber-reinforced resin layer in the invention can be carried out by the same procedures as the above procedures for laminating urethane-based resin layers on the fiber-reinforced resin layer.

The laminated product of the invention is required to have two or more layers obtained by adhering an urethane-based resin layer on one surface of the fiber-reinforced resin layer which exhibits dimensional stability. The fiber-reinforced resin layer is thought to inhibit large expansion and contraction due to temperature change of the urethane-based resin layer and the laminated product can maintain dimensional stability.

The most preferred embodiment of the laminated product in the invention has three or more layers obtained by laminating a urethane-based resin layer on one side of the fiber-reinforced resin layer and further laminating the same or different species of a resin layer on the other side of the surface. When the laminated product has only two layers consisting of a fiber-reinforced resin layer and an urethane-based resin layer, warpage is liable to occur, even though the dimensional stability of the laminated product of the invention can be maintained. The warpage is thought to develop due to the difference of dimensional change between the fiber-reinforced resin layer and the urethane-based resin layer. For example, when a laminated product having above two layers alone is heated before adhering to a substrate, the urethane-based resin layer causes greater expansion and the laminated product is liable to warp to the upper side. Further, the laminated product is cooled from a hot stage to room temperature or less, the laminated product is liable to warp to the bottom side. However, such warpage does not develop after adhering to the substrate so long as sufficient adhesive strength is maintained, and gives no influence on the dimensional stability of the laminated product in the invention. In an environment repeating a drastic temperature change or in the case of insufficient adhesive strength to the substrate, there is a slight possibility for peeling the applied tile. However, the laminated product of three layers can eliminate the slight possibility for peeling the tile. The same or different species of a resin layer is further laminated on the opposite surface to the surface for laminating the urethane-based resin layer to form a three-layered structure having the fiber-reinforced resin layer as an intermediate layer. The resulting laminated product can avoid danger for peeling the laminated product from the substrate. The object for laminating the same or different species of resin layer is to substantially avoid apparent warpage by balancing the warping force on the upper and bottom surfaces of the fiber-reinforced resin layer, and thus to avoid danger for peeling the laminated product after adhesion to the substrate. on the basis of the above concept, it is most ideal that the same or different species of resin have the same composition as the urethane-based resin and the thickness to be laminated is also the same. However, no particular restriction is imposed upon the process. Because the laminated product of the invention can satisfactory exhibit dimensional stability and application ability in the absence of danger for warpage, even though consisting of the above two layers alone.

The laminated product of the invention can preferably exemplify a process for further laminating non-woven fabric on the outside of the same or different species of resin layer. Physical adhesive force to the urethane-based resin layer is generated by lamination of the non-woven fabric and various species of adhesive can be used for adhesion to the substrate. No particular restriction is imposed upon the non-woven fabric. Polyester non-woven fabric can be preferably used similarly to the non-woven fabric used for the above fiber-reinforced resin layer. The amount of lamination is preferably 5 to 150 g/m². The non-woven fabric can be laminated by the same procedures as laminating the above fiber-reinforced resin layer and urethane-based resin layer.

On the laminated product of the invention, it is preferably exemplified to further laminate a pressure-sensitive adhesive layer on the opposite surface of the fiber-reinforced resin layer to the surface for laminating the urethane-based resin layer. By lamination of the pressure-sensitive adhesive layer, the laminated product can be adhered to the substrate without using an adhesive in the application step, and an application time can be further reduced. No particular limitation is put upon the pressure-sensitive adhesive layer. The pressure-sensitive adhesive layer can be selected by consideration of adhesion to the substrate. For example, rubber-based and acrylic-based pressure-sensitive adhesive can be preferably used for wood-based substrate, and pressure-sensitive adhesive asphalt can be used for concrete-based substrate.

On the laminated product in the invention, further lamination of a pressure-sensitive adhesive layer on the outside of the same or different species of resin layer is also preferred because the above application time can be reduced.

The laminated product in the invention has a linear expansion coefficient of $2.0 \times 10^{-5}/°$ C. or less as a dimensional stability for the two fiber directions. The coefficient exceeding $2.0 \times 10^{-5}/°$ C. is unfavorable because the effect on the dimensional stability in the invention cannot be clearly found. The reason is that most of tiles prepared from polyvinyl chloride resin and other conventional polymers have a linear expansion coefficient of $2 \times 10^{-5}/°$ C. to $8 \times 10^{-5}/°$ C.

The present inventors have examined selectionships between the phenomenon of knock-out or joint exposure and the linear expansion coefficient of practically applied tiles, and have found that a visually confirmable change does not appear when a dimensional change of the tile is 0.1% or less in a side length of the tile. According to the result, a linear expansion coefficient of $2.0 \times 10^{-5}/°$ C. or less is required for inhibiting knock-out or joint exposure when a drastic temperature rise of 50° C. is caused by pouring hot water on the applied tile.

On the other hand, dimensional change on heating is 0.10% or less. The dimensional change on heating is a measured value for anticipating a long-term dimensional change after application. A value exceeding 0.10% is unfavorable for the same reason as the above linear expansion coefficient.

The laminate product of the invention has a thickness of preferably 1 to 5 mm. When the thickness of the laminated product is lower than 1 mm, the urethane-based resin layer becomes too thin and the durability of urethane-based resin cannot be fully exhibited. On the other hand, when the thickness of the laminated product exceeds 5 mm, the urethane-based resin becomes too thick and it is unfavorable that warpage is liable to generate, fabrication becomes difficult, and the cost is increased. The urethane-based resin layer in the above laminated product preferably has a thickness of 0.3 to 3.0 mm.

The laminated product of the invention is preferably a sheet having width of 50 to 2,000 mm or a tile having a side length of 50 to 2,000 mm in view of improving application ability. However, the shape of the laminated product is not always limited to a sheet or a tile, that is, a rectangle or a square. Any shape of the laminated product can sufficiently exhibit dimensional stability of the invention.

On the laminated product of the invention, a thin layer for protecting the urethane-based resin layer can be further coated on the surface of the urethane-based resin layer in a thickness not impairing the characteristics of the urethane-based resin layer. For example, conventional urethane-coated flooring uses an acrylic-based or urethane-based top-coating agent of solvent dilution type in order to provide weatherability or chemical resistance. Such top-coating agent can also be used preferably for the laminated product in the invention.

The application method of the laminated product in the invention can be selected from a method for previously laminating an adhesive layer on the laminated product as mentioned above and adhering to the substrate in site, and a method for coating an adhesion in site on the substrate or the laminated product of the invention and applying to the substrate. The adhesive can be selected depending upon the finish of adhesion surface on the laminated product in the invention, species of substrate and use. It is also a preferred embodiment to coat a pressure-sensitive adhesive, surface irregularity adjuster or primer and successively apply the laminated product of the invention to the substrate in order to maintain adhesion strength depending upon substrate material or surface smoothness. The adhesive can be suitably selected depending upon the object from, for example, vinyl-based or urethane-based adhesive which is conventionally used for high polymer tiles.

Application method of the laminated product of the invention is, for example, to set clearance of 1 to 10 mm in a joint portion and fill the said clearance with a sealing agent. The method is preferably used for exerting waterproof property of the urethane-based resin in particular. No particular restriction is imposed upon the sealing agent so long as joint exposure and other joint destruction do not occur. The sealing agents which can be preferably used are, for example, modified silicone, polyurethane and polysulfide in view of good adhesion to the urethane-based resin in a joint area.

EXAMPLES

The present invention will hereinafter be illustrated further in detail by way of examples. However, these examples do not limit the scope of the invention. Measurement and evaluation were carried out by the following methods.
(1) Dimensional Change on Heating (%)
Dimensional change of a laminated tile between before and after heating at 80° C. for 6 hours in accordance with JIS A-5705.
(2) Linear Expansion Coefficient (/° C.)
A laminated tile was cut into dimensions of 300×300 mm and dimension was measured at 0° C. and 50° C.
Linear expansion coefficient was calculated from the following equation.

Linear expansion coefficient $(/^\circ C.) = (L_{50} - L_0)/(50 \cdot L_0)$ $L_0$: dimension at 0° C.

$L_{50}$: dimension at 50° C.

(3) Warpage Evaluation

A laminated tile was cut into dimensions of 300×300 mm, and placed on a plate. A degree of warpage was measured as an amount of maximum relief at the end portion and divided into the following classes.

⊚: Quite no relief (no warpage) was found.

○: Relief less than 5 mm was found.

Δ: Relief of 5 to 10 mm was found.

X: Relief larger than 10 mm was found.

(4) Evaluation of Joint Area

A laminated tile was cut into dimensions of 100×100 mm. Nine sheets of the resulting cut tile were adhered to a slate plate having dimensions of 500×500 mm by using a pressure sensitive adhesive or an adhesive. Two thermostatic ovens were maintained at −20° C. and 80° C., respectively. A specimen thus obtained was alternately placed in each oven for 10 min, respectively. The procedure was repeated 10 times. Thereafter, joint area was visually observed and evaluated as follows. In the case of a forced joint, the joint had a clearance of 4 mm and the laminated tile was cut into dimensions of 98×98 mm.

○: Quite no knock-out or gap was found. No peeling of tile was found.

Δ: Slight knock-out was observed portionally.

X: Evident knock-out or joint exposure was visually observed. The tile was peeled.

(5) Interlayer Peeling Strength (N/cm)

In accordance with JIS A-1454, ply separation strength between a fiber-reinforced resin layer and a urethane-based resin layer of the invention was measured by a 180 degree peel strength test.

(6) Melt Flow Index

Measured in accordance with ASTM D-1238.

Example 1

A monofilament of E-glass fiber having a size of 17 μm was treated with a silane coupling agent and successively 1,000 fibers were collected to a yarn, paralleled under tension, brought into contact with molten polypropylene resin and impregnated while wiping with hot rolls to obtain a prepreg sheet having a glass fiber proportion of 50% by volume.

Figure 2:
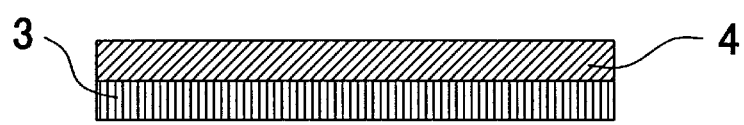
FIG. 2 is a sectional view of a two-layered, laminated product of the invention.

Thereafter, two prepreg sheets thus obtained were laminated so as to intersect two fiber directions at right angles. A polyester non-woven fabric was further laminated on both surfaces of the resulting laminated sheet to obtain a glass-fiber reinforced PP sheet as shown in FIG. 1. The grade of the PP sheet is PREGLON-LF sheet: LF15N/R15 (manufactured by Mitsui Chemicals Inc., glass fiber size: 17 mm, prepreg thickness: 250 μm, laminated with a 15 g/cm² polyester non-woven fabric on both surfaces). The PP sheet was cut into dimensions of about 1×1 m and horizontally fixed on a plywood and sprayed on the surface with a two component curing type urethane raw material: RIMSPRAY F-1000 (manufactured by Mitsui Chemicals Inc.) by using collision mixing spray machine: H-2000 (manufactured by Gusmer Co. in USA) at component temperature of about 60° C. under spray pressure of about 105 kg/cm². After curing a dry, laminated product having two layers as shown in FIG. 2 was obtained and had a thickness of 2.3 mm. Additionally, the above sheet was as intact horizontally fixed on the plywood during curing in order to minimize sheet warpage accompanied by curing shrinkage of urethane.

Tile specimens were cut from the laminated product thus obtained in order to use for measuring dimensional change on heating, linear expansion coefficient, warpage and interlayer peeling strength.

On the other hand, other specimens having dimensions of 300×300 mm were cut from anther portion of the laminated product, and further cut into 9 sheets of tile having dimensions of 100×100 mm. A vinyl-based adhesive for flooring: CEMEDINE 190 (manufactured by Cemedine Co.) was applied to one surface of the resulting tile with a thickness of 0.5 mm, adhered to the center of a slate plate having dimensions of 500×500 mm so as to make a butt joint each other and cured for 3 days to obtain a specimen for evaluating joint area.

As shown Table 1, the laminated product had a dimensional change on heating of 0.05% and a linear expansion coefficient of $1.1 \times 10^{-5}/^\circ$ C. and thus was extremely excellent in dimensional stability. Evaluation of warpage was Δ and warpage was relatively remarkable before a adhering to the substrate. However, evaluation of joint are was ○ after adhering to the substrate and no problem was found at all. Further, interlayer peeling strength was 10 N/cm, which was satisfactory to practical use.

Example 2

In a process for laminating a urethane-based resin layer on a glass fiber-reinforced PP sheet, the glass fiber-reinforced PP sheet was cut into dimensions of 1×1 m and horizontally placed on a flat metal plate equipped with a frame having the same dimensions of 1×1 m. A two components curing type urethane material: SUNSIRAL-F (manufactured by Mitsui Chemicals Inc.) was mixed with stirring and coated on the surface of PP sheet which was placed in the frame so as to form a urethane-based resin layer having a thickness of 2 mm after curing. After curing for a day, a laminated product consisting of two layers as shown in FIG. 2 and having a thickness of 2.3 mm was obtained. Other procedures were the same as carried out in Example 1. Interlayer peeling strength was not measured.

As shown in Table 1, the laminated product had a dimensional change on heating of 0.06% and a linear expansion coefficient of $1.2 \times 10^{-5}/^\circ$ C., and was thus very excellent in dimensional stability. Warpage evaluation was ○, which was very small and joint area evaluation was also ○, which was good.

Example 3

The same glass fiber-reinforced PP sheet as Example 1 was cut into a square of 500×500 mm in dimensions. On the other hand, adipate ester-based thermoplastic polyurethane: RESAMINE P-1078 (manufactured by Dainichiseika Ind. Co.) was preheated in a compression molding machine at 180° C. for 30 seconds and then compression molded for a minute under pressure of 10 kg/cm² to obtain a thermoplastic polyurethane sheet having a thickness of 2 mm and dimensions of about 500×500 mm. Successively, by using the same compression molding machine, the glass fiber-reinforced PP sheet which was previously cut as above was superimposed on the resulting thermoplastic polyurethane sheet, preheated at 180° C. for 30 seconds, and compression molded for a minute under the pressure of 1 kg/cm² to obtain a laminated product consisting of two layers as shown in FIG. 2 and having a thickness of 2.2 mm. The laminated product was taken out of the compression molding machine, inserted between plates, and cooled to room temperature in order to minimize warpage. Tile specimens were cut from the resulting laminated product and used for measuring dimensional change on heating, linear expansion coefficient and warpage.

On the other hand, another portion of the above laminated product was cut into a square having dimensions of 300×300 mm and further cut into 9 sheets of tile having dimensions of 100×100 mm. A vinyl-based adhesive for flooring: CEMEDINE-190 (manufactured by Cemedine Co.) was coated on one surface of the resulting tile specimen with a thickness of 0.5 mm. Successively, these tile specimens were adhered to the center part of a slate plate so as to form a butt joint each other and cured for 3 days. Thereafter, the state of joint area was evaluated.

As shown in Table 1, the laminated product had a dimensional change on heating of 0.07% and a linear expansion coefficient of $1.5 \times 10^{-5}/°$ C. and thus was very excellent in dimensional stability. Warpage evaluation was Δ and warpage was relatively remarkable before adhering to the substrate. However, joint area evaluation was ○ after adhering to the substrate and no problem was found at all.

Example 4

A glass-fiber reinforced PP sheet without laminating non-woven fabric: PREGLON-L sheet L15N was subjected to corona discharge treatment on both surfaces so as to obtain surface tension of 50 dyne/cm. Other procedures were the same as carried out in Example 1 to obtain a laminated product consisting of two layers as shown in FIG. 2 and having a thickness of 2.2 mm.

As shown in Table 1, the laminated product had a dimensional change on heating of 0.06% an a linear expansion coefficient of $1.2 \times 10^{-5}/°$ C., and thus dimensional stability was very good. Warpage evaluation was Δ and warpage was relatively remarkable before adhering to the substrate. However, evaluation of joint area was ○, that is, good after adhering to the substrate and thus quite no problem was found. Further, the interlayer peeling strength was 14 N/cm. The strength was satisfactory and much greater than the strength obtained by laminating non-woven fabric.

Example 5

Figure 3:
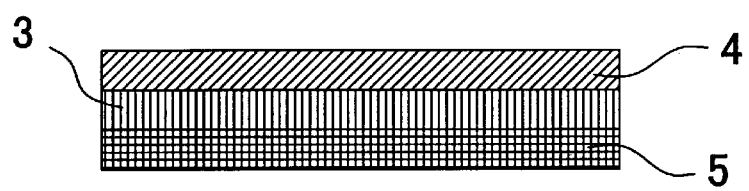
FIG. 3 is a sectional view of a three-layered, laminated product obtained by further laminating a pressure-sensitive adhesive layer on the two layered, laminated product in the invention.

The same glass fiber-reinforced PP sheet as Example 1 was cut into a square of 500×500 min in dimensions and horizontally placed on an aluminum plate having a thickness of 3 mm. Modified asphalt having a softening point of 100° C. was melted at 200° C. and coated on the PP sheet with a thickness of 1 mm. A release paper was placed on the coated surface when the molten asphalt was cooled and solidification initiated. A plate was further put on the release paper and pressed so as to obtain a solidified asphalt layer having a thickness of 0.5 mm. A glass fiber-reinforced PP sheet laminated with a pressure sensitive adhesive layer was thus obtained. The PP sheet was horizontally fixed on plywood so as to render the adhesive layer bottom. A two component curing type urethane raw material: RIMSPRAY F-1000 (manufactured by Mitsui Chemicals Inc.) was sprayed on the fixed sheet with a collision mixing spray machine: H-2000 (manufactured by Gusmer Co. in USA) at component temperature of 60° C. under the spraying pressure of 105 kg/cm² so as to obtain a cured urethane-based resin layer having a thickness of 2 mm. After curing for a day, a laminated product was obtained. The product consisting of three layers as shown in FIG. 3 and had a thickness of 2.8 mm. Additionally, the above sheet was as intact fixed on the plywood during the curing in order to minimize sheet warpage accompanied by urethane shrinkage in the course of curing. Tile specimens were cut out from the resulting laminated product and used for measuring a dimensional change on heating, expansion coefficient and warpage.

Separately, another portion of the above laminated product was cut into a square having dimensions of 300×300 mm and further cut into 9 sheets of tile having dimensions of 100×100 mm. A vinyl-based adhesive for flooring: CEMEDINE-190 (manufactured by Cemedine Co.) was coated on one surface of the resulting tile specimen with a thickness of 0.5 mm. Successively, these tile specimens were adhered to the center part of a slate plate having dimensions of 500×500 mm so as to make a butting state each other and cured for 3 days to obtain a specimen for evaluating joint area.

As shown in Table 1, the laminated product had a dimensional change on heating of 0.05% and a linear expansion coefficient of $1.2 \times 10^{-5}/°$ C. and thus dimensional stability was very good. Evaluation of Warpage was Δ and warpage was relatively marked before adhering to the substrate. However, evaluation of joint area was ○ after adhering to the substrate and quite no problem was found.

Example 6

Figure 4:
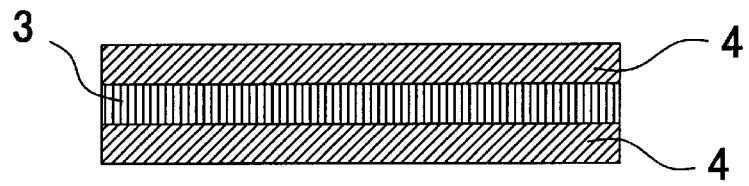
FIG. 4 is sectional view of a three-layered, laminated product of the invention.

The same glass fiber-reinforced PP sheet as Example 1 was cut into a square having dimensions of about 1×1 m and was horizontally fixed on a plywood. A two component curing type urethane raw material: RIMSPRAY F-1000 (manufactured by Mitsui Chemicals Inc.) was sprayed at a material temperature of 60° C. under the spraying pressure of 105 kg/cm² by using a collision mixing spray machine: H-2000 (manufactured by Gusmer Co. in USA) so as to obtain a cured urethane-based resin layer having a thickness of 1 mm. After about five minutes from the above spraying, the above urethane material was similarly sprayed on the other surface of the PP sheet so as to make thickness of cured urethane-bases resin 1 mm and cured for a day. The laminated product thus obtained consisted of three layers as shown in FIG. 4 and had a thickness of 2.3 mm. Additionally, the above sheet was as intact fixed on the plywood during the curing in order to minimize sheet warpage accompanied by urethane shrinkage in the course of curing. The laminated product thus obtained was cut into tile specimens and used for measuring a dimensional change on heating, linear expansion coefficient and warpage.

Separately, a portion of the laminated product was cut into a square having dimensions of 300×300 mm and further cut into 9 sheets of tile having dimensions of 100×100 mm. A vinyl-based adhesive for flooring: CEMEDINE-190 (manufactured by Cemedine Co.) was coated on one surface of these tiles with a thickness of 0.5 mm. Successively, these tiles were adhered to the center part of a slate plate having dimensions of 500×500 mm so as to make a butting state each other and cured for 3 days to obtain a specimen for evaluating joint area.

As shown in Table 1, the laminated product had a dimensional change on heating of 0.04% and a linear expansion coefficient of $0.9 \times 10^{-5}/°$ C. and thus dimensional stability was very good. Warpage evaluation was ☉ and no warpage can be found at all. Evaluation of joint area was ○ and quite no problem was observed.

Example 7

Figure 5:
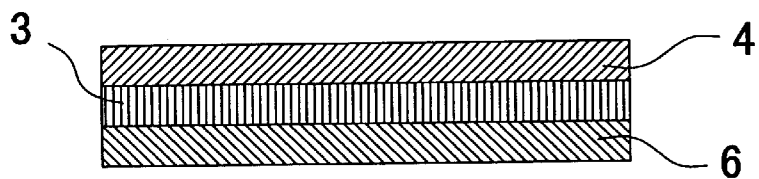
FIG. 5 is sectional view of another embodiment on the three-layered, laminated product in the invention.

Similarly to Example 6, a urethane material was sprayed on one surface of a glass fiber-reinforced PP sheet so as to obtain a urethane resin layer having a thickness of 1 mm and cut into a square having dimensions of 500×500 mm. On the opposite surface of the PP sheet, an ethylene/butene random copolymer sheet: TAFMER A-4085 having a thickness of 1 mm, dimensions of 500×500 mm and melt flow index of 6.7 g/10 min at 230° C. (manufactured by Mitsui Chemicals Inc.) was superimposed, preheated at 180° C. for 30 seconds and compression molded for a minute under the pressure of 1 kg/cm². The resulting laminated product consisted of three layers as shown in FIG. 5 and had a thickness of 2.2 mm. The laminated product thus obtained was cut into tile specimens for measuring a dimensional change on heating, linear expansion coefficient and warpage.

Separately, a portion of the laminated product was cut into a square having dimensions of 300×300 mm and further cut into 9 sheets of tile having dimensions of 100×100 mm. A vinyl-based adhesive for flooring: CEMEDINE-190 (manufactured by Cemedine Co.) was coated on one surface of these tiles with a thickness of 0.5 mm. Successively, these tiles were adhered to the center part of a slate plate having dimensions of 500×500 mm so as to form a butting state each other and cured for 3 days to obtain a specimen for evaluating joint area.

As shown in Table 1, the laminated product had a dimensional change on heating of 0.05% and a linear expansion coefficient of $1.1\times10^{-5}/°$ C. and thus dimensional stability was very good. Evaluation of warpage was ○ and no warpage was observed to some extent. However, evaluation of joint area was ○ after adhesion to the substrate and quite no problem was found.

Example 8

Figure 6:
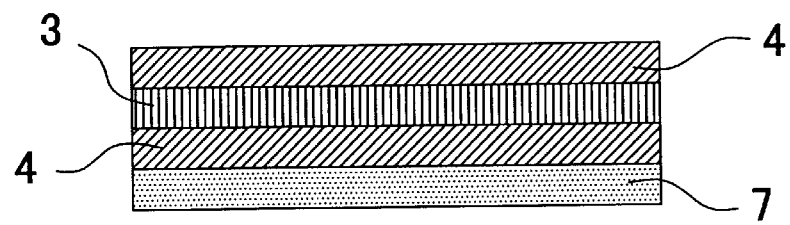
FIG. 6 is sectional view of a four-layered, laminated product obtained by further laminating a non-woven fabric on the three-layered, laminated product of the invention.

A polyester non-woven fabric of 30 g/m²: ECULE6501A (manufactured by Toyobo Co.) was adhered to the surface of glass fiber-reinforced PP sheet immediately after the second spraying to obtain a laminated product consisting of four layers as shown in FIG. 6 and having a thickness of 2.6 mm. Other procedures were the same as carried out in Example 6.

As shown in Table 1, the laminated product had a dimensional change on heating of 0.05% and a linear expansion coefficient of $1.1\times10^{-5}/°$ C. and thus dimensional stability was very good. The evaluation of warpage was ⊚ and no warpage was found at all. The evaluation of joint area was ○ after adhesion to the substrate and quite no problem was found.

Example 9

Figure 7:
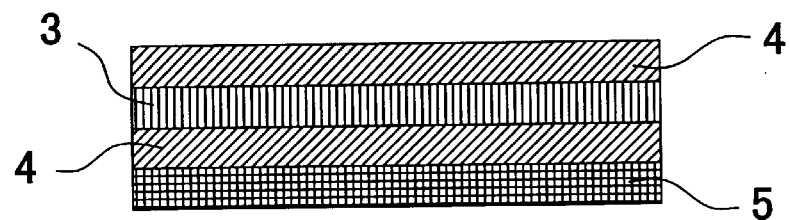
FIG. 7 is sectional view of a four-layered, laminated product obtained by further laminating a pressure-sensitive adhesive layer on the three-layered, laminated product of the invention.

A modified asphalt having a softening point 100° C. was melted at 200° C. and coated with a thickness of about 1 mm on one surface of the laminated product obtained in Example 6. A release paper was placed on the coated surface when the molten asphalt was cooled and solidification initiated. A plate was further out on the release paper and pressed so as to obtain 0.5 mm in the thickness of solidified asphalt. A laminated product thus obtained had four layers as shown in FIG. 7 and had a thickness of 2.9 mm. The laminated product thus obtained was cut into tile specimens and used for evaluating a dimensional change on heating, linear expansion coefficient and warpage.

Separately, a portion of the laminated product thus obtained was cut into a square having dimensions of 300×300 mm and further cut into 9 sheets of tile having dimensions of 100×100 mm. The release paper was peeled off and these tiles were adhered to the center of a slate plate having dimensions of 500×500 mm so as to form a butting state each other to form a specimen for evaluating joint area.

As shown in Table 1, the laminated product had a dimensional change on heating of 0.06% and a linear expansion coefficient of $1.1\times10^{-5}/°$ C. and thus dimensional stability was very good. Warpage evaluation was ⊚ and no warpage was found at all. Joint area evaluation was also ○ after adhesion to the substrate and quite no problem was observed.

Example 10

A portion of the laminated product obtained in Example 6 was cut into a square having dimensions of 294×294 mm and further cut into 9 sheets of tile having dimensions 98×98 mm. A vinyl-based adhesive for flooring: CEMEDINE 190 (manufactured by Cemedine Co.) was coated with a thickness of 0.5 mm on one surface of the tile. Successively, these coated tiles were adhered to the center of a slate plate having dimensions of 500×500 mm so as to form clearance of 4 mm each other and cured for 3 days to make a forced-joint. Thereafter, a masking tape having a width of 2 cm was adhered to the peripheral portion of these tiles. A silicone caulking agent: TOYOSILICONCAUK TS-200 (manufactured by Toyo Chemical Co.) was poured slightly in excess into the joint and immediately wiped the joint area by using a side of a resin plate in order to make smooth finish. Thereafter, the masking tape was peeled off and curing was carried out for a day to complete joint treatment.

As shown in Table 1, the evaluation of joint area was ○. No peeling was found between side face of the tile and caulking agent. Quite no peeling of the tile was observed.

Comparative Example 1

The same procedures as Example 1 were carried out except that the urethane material was sprayed on the glass fiber-reinforced PP sheet with a thickness of 5 mm to obtain a laminated product having a thickness of 5.3 mm. The measurement of interlayer peeling strength was not carried out.

As shown in Table 1, the laminated tile had a dimensional change on heating of 0.11% and a linear expansion coefficient of $2.6\times10^{-5}/°$ C. and thus dimensional stability was poor. Evaluation of warpage was X and warpage was large. Evaluation of joint area after adhering to the substrate was △ and partial knock-out of the joint area was found at 80° C.

Comparative Example 2

The glass fiber-reinforced sheet in Example 1 was replaced by a laminated sheet which was obtained by hot lamination of polyester non-woven fabric on both surfaces of a PP sheet having a thickness of 250 μm. Other procedures were the same as Example 1.

As shown in Table 1, the resulting laminated product had a dimensional change on heating of 0.18% and a linear expansion coefficient of $5.2\times10^{-5}/°$ C. and thus stability was very poor. Evaluation of warpage was X and thus warpage was large. Evaluation of joint area after adhesion to the substrate was also X. In the almost overall portion of tiles, joint exposure was found at −20° C. and large knock-out was observed at 80° C.

TABLE 1

| Ex. or Comp. Ex. | Dimensional change on heating (%) | Linear expansion coefficient (×10−5/° C.) | Warpage evaluation | Joint-area evaluation | Interlaying peeling strength (N/cm) |
|---|---|---|---|---|---|
| Ex. 1 | 0.05 | 1.1 | Δ | ○ | 10 |
| Ex. 2 | 0.06 | 1.2 | ○ | ○ | — |
| Ex. 3 | 0.07 | 1.5 | Δ | ○ | — |
| Ex. 4 | 0.06 | 1.2 | Δ | ○ | 14 |
| Ex. 5 | 0.05 | 1.2 | Δ | ○ | — |
| Ex. 6 | 0.04 | 0.9 | ⊚ | ○ | — |
| Ex. 7 | 0.05 | 1.1 | ○ | ○ | — |
| Ex. 8 | 0.05 | 1.1 | ⊚ | ○ | — |
| Ex. 9 | 0.06 | 1.1 | ⊚ | ○ | — |
| Ex. 10 | — | — | — | ○ | — |
| Comp. Ex. 1 | 0.11 | 2.6 | x | Δ | — |
| Comp. Ex. 2 | 0.18 | 5.2 | x | x | — |

CAPABILITY OF EXPLOITATION IN INDUSTRY

Conventional technology could not attain dimensional stability of high polymer-based tile after application.

According to the present invention, both dimensional stability for temperature change and long term dimensional stability after application can be achieved. Conventional problems concerning knock-out or exposure of joint area can be eliminated by the effect of the invention. The dimensional stability of the invention can be obtained without any loss of properties of conventional urethane-based resin material. Further, present invention can extensively shorten application time as compared with the poured flooring technique which has conventionally been a principal application method for the urethane-based resin flooring. That is, improvement of application ability can be achieved. Consequently, the laminated product of the invention is suited for indoor and outdoor flooring, wall covering and road paving.

What is claimed is:

1. A laminated product formed by laminating a urethane resin layer on a fiber-reinforced resin layer having two or more layers and being obtained by laminating two or more prepreg sheets so as to intersect fiber directions at right angles or being obtained by laminating two or more prepreg sheets so as to intersect fiber directions at right angles and laminating a non-woven fabric on one or both surfaces of the resulting laminated prepreg sheets, wherein said prepreg sheets have a thickness of 50 to 1,000 μm and are obtained by arranging a continuous reinforcing fiber in one direction and impregnating the arranged continuous reinforcing fiber with thermoplastic resin so that said continuous reinforcing fiber is present in a amount of 40 to 80% by volume, said laminated product having a linear expansion coefficient of $2.0 \times 10^{-5}/°$ C. or less when measured at 0° C. and 50° C. and a thermal dimensional variation of 0.1% or less in dimensional stability for the two fiber directions of the laminated prepreg sheets.

2. The laminated product according to claim 1, wherein the laminated product has a thickness of 1 to 5 mm.

3. The laminated product according to claim 1, wherein the laminated prepreg sheets are subjected to electrical discharge treatment on one or both surface to obtain a surface tension of 40 to 60 dyne/cm.

4. The laminated product according to claim 1, wherein the urethane resin layer has a thickness of 0.3 to 3.0 mm.

5. The laminated product according to claim 1, wherein the continuous reinforcing fiber used in the prepreg sheets is glass fiber and the thermoplastic resin is polypropylene.

6. The laminated product according to claim 1, wherein a pressure sensitive adhesive layer is laminated on the surface of fiber-reinforced resin layer opposite the surface of laminating the urethane resin layer.

7. The laminated product according to claim 1, wherein a further resin layer is laminated on the surface of fiber-reinforced resin layer opposite the surface of laminating the urethane resin layer.

8. The laminated product according to claim 7, wherein a pressure-sensitive adhesive layer is laminated on the further resin layer.

9. The laminated product according to claim 7, wherein a non-woven fabric is laminated on the surface of the further resin layer.

10. The laminated product according to claim 1, wherein the laminated product is a sheet having a width of 50 to 2,000 mm.

11. A tile formed of the laminated product according to claim 1, wherein the tile has a side length of 50 to 2,000 mm.

12. A process for applying a laminated product according to claim 11, wherein two or more tiles are applied side by side to a substrate to establish a joint area having a clearance and filling the clearance with a sealing agent.

13. A process for applying a laminated product according to claim 10, wherein two or more laminated products are applied side by side to a substrate to establish a joint area having a clearance and filling the clearance with a sealing agent.

* * * * *